Figure 1A:
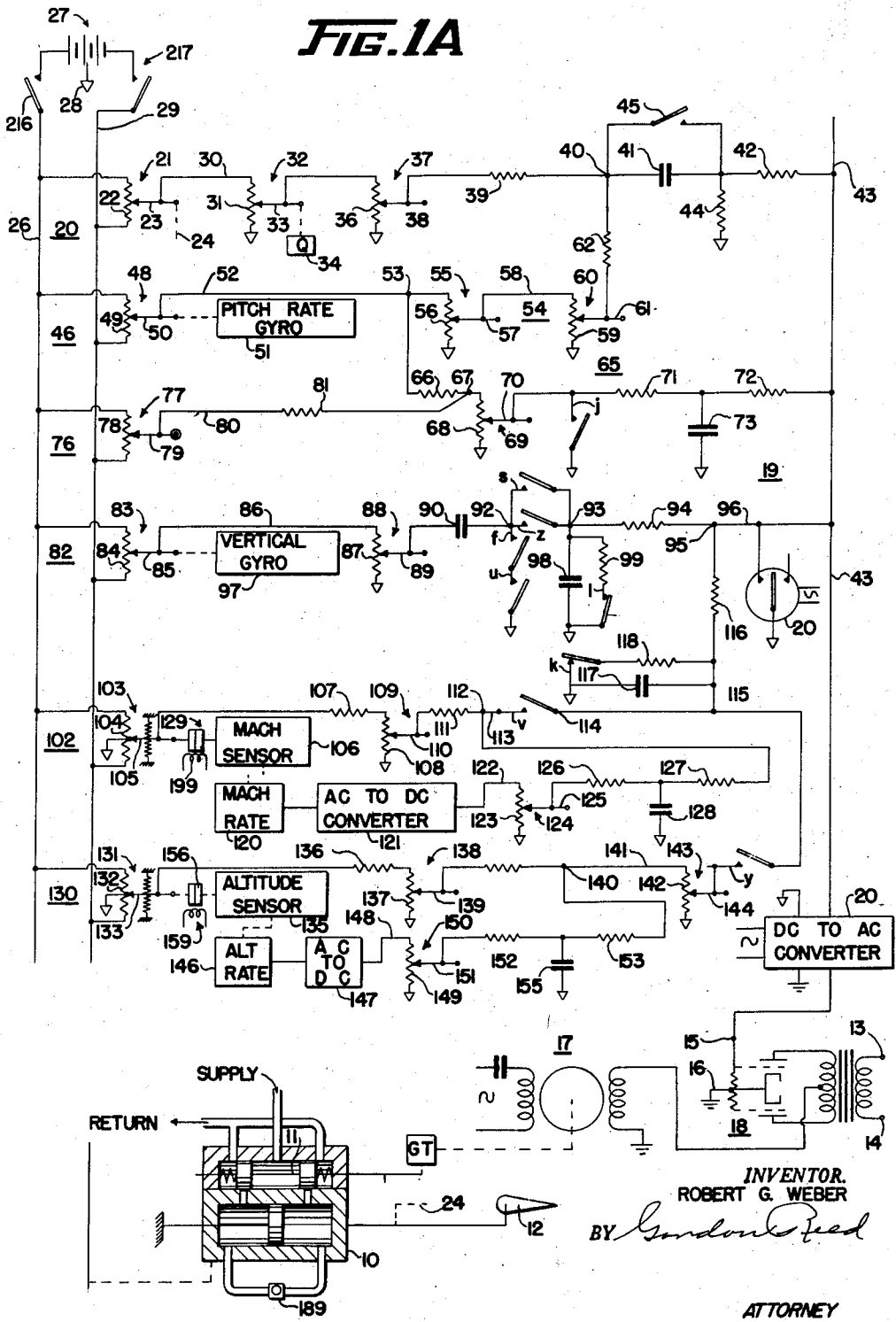

July 12, 1960     R. G. WEBER     2,944,768
AUTOMATIC PILOT
Filed Dec. 13, 1955     2 Sheets-Sheet 1

INVENTOR.
ROBERT G. WEBER
BY Gordon Reed
ATTORNEY

July 12, 1960

R. G. WEBER 2,944,768

AUTOMATIC PILOT

Filed Dec. 13, 1955

2 Sheets-Sheet 2

INVENTOR.
ROBERT G. WEBER
BY
ATTORNEY

United States Patent Office 2,944,768
Patented July 12, 1960

2,944,768

AUTOMATIC PILOT

Robert G. Weber, Coon Rapids, Minn., assignor to Minneapolis-Honeywell Regulator Company, Minneapolis, Minn., a corporation of Delaware Filed Dec. 13, 1955, Ser. No. 552,848

9 Claims. (Cl. 244—77)

This invention relates to automatic control apparatus and particularly to automatic pilots for dirigible craft, such as aircraft. While an automatic pilot for an aircraft usually in its broadest form controls the craft about its turn, roll, and pitch axes, the present invention primarily is directed to an automatic pilot to control about the pitch axis of the craft.

One object of the invention is to simplify and improve the introduction and withdrawal of the effect of a flight condition responsive device on said pitch axis control automatic pilot.

A further object of the invention is to simplify and improve the selective introduction of two control devices alternatively on said pitch axes control apparatus and their withdrawal therefrom.

A further object of the invention is to provide novel means to effect the introduction and withdrawal of the control effect of a flight condition sensing device on pitch axes control apparatus by means of which the controlled effect may be slowly increased and slowly decreased and wherein such means for effecting slow decrease has no tendency permanently to alter the form of control effect from other sensing devices in said apparatus.

A further object of this invention is to selectively effect control by either of two sensing devices of said pitch axes control apparatus including time delay means for "fading out" the control from one device and "fading in" a control of said apparatus by said other device.

Another object of the invention is to provide in automatic flight control apparatus the capability of controlling the attitude of the craft in response to two alternatively selected sending devices without causing abrupt deflection of the attitude control device of the craft.

In accordance with the present invention, an automatic pilot system has been provided for regulating the position of an attitude control member of the craft such as the aileron surfaces or elevator surface of an aircraft. The position of the elevator surface is dependent upon the variation of a craft attitude signal relative to a selected signal which may also vary in accordance with a second flight condition of the craft. In the present arrangement while the attitude control member of the craft may be controlled by the attitude responsive member, control from the second condition sensing device is gradually introduced, so that there is no abrupt deflection of the attitude control member.

Additionally, in the present invention, the attitude sensing means may have its control supplemented by a second additional sensing device responsive to a third flight condition of the craft and during the transference of control from the second to the third sensing device, the effect of the second sensing device is slowly decreased while that of the third sensing device is slowly increased to additionally avoid abrupt deflections of the craft attitude control member.

More particularly in accordance with the principles of the present invention, the control apparatus embodies a D.C. parallel summing voltage network wherein an attitude signal voltage is supplied to said network and this attitude control may be supplemented by additional alternatively selected signals from two sources of voltage responsive to separate and other conditions of flight of the craft. The control effect from either of the other sensing devices is introduced through a charging circuit to effect a slow increase in the control effect from the particular sensing device of the network and its effect is decreased through a discharging circuit to gradually decrease its effect on the apparatus. Furthermore even in the absences of charging circuits, the control effect will be introduced in increasing magnitude from each sensing device.

Figure 1B:
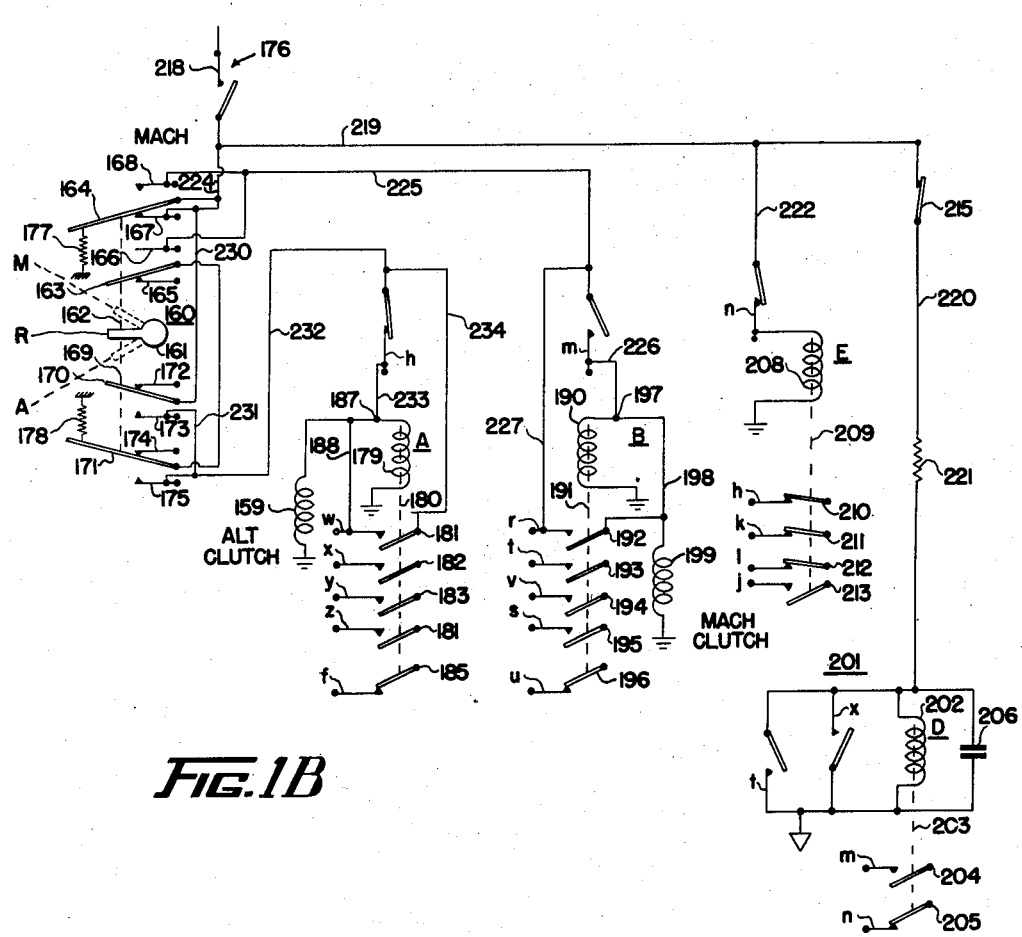

Other objects and advantages of the invention will become apparent from the specification taken in connection with accompanying drawings, wherein:

Figures 1A and 1B together constitute a schematic embodiment of the present invention applied to the pitch axis control apparatus of an aircraft.

In Figure 1A there is shown a main servo mechanism or motor means 10 arranged for positioning the attitude control member of an aircraft. The motor means may be of the hydraulic type having a cylinder assembly connected to the attitude control member and wherein the ram is fixed to the craft. The servomotor is controlled by an operable valve 11 spring-centered to an unoperative position wherein no fluid passes through the valve to the ram. The displacement of the spring-centered valve 11 from its inoperative position is effected through a torque motor 17 connected thereto. The torque motor 17 in turn is controlled from an elevator servo amplifier 18. The torque motor and amplifier may be similar to that disclosed in the patents to Beers 2,020,275 or Taylor 2,388,350, wherein the motor 17 may be of a capacitor type induction motor having a line winding energized from an A.C. supply and an amplifier energized winding. The servo amplifier 18 is of the A.C. discriminator type and comprises A.C. power input terminals 13, 14 and A.C. circuit input terminals 15 and 16. The torque motor 17 tends to rotate in one or the other direction depending upon the phase relationship of the A.C. voltage across power terminals 13, 14 relative to the voltage across signal input terminals 15, 16. A resultant control signal supplied by balanceable network 19 is converted from D.C. to A.C. through a converter 20, and A.C. control signals are applied to the servo amplifier signal terminals 15, 16. The converter 20 may be of the vibrator type well known in the prior art and is operated from A.C. voltage derived from the source supplying amplifier terminals 13, 14.

Balanceable network 19 is a parallel summing D.C. signal control network, and its sources of control signals comprise a follow-up signal generator 20, a pitch rate signal generator 46, a trim signal generator 76, a pitch attitude signal generator, 82, a Mach displacement signal generator 102, a Mach rate signal generator 120, an altitude displacement signal generator 130, and an altitude rate signal generator 146.

The follow-up signal generator 20 comprises a follow-up potentiometer 21 having a resistor 22 connected across D.C. supply conductors 26, 29. Conductor 26 is energized from the positive side of a D.C. supply such as a battery 27 and conductor 29 is energized from the negative side of the D.C. supply. The D.C. supply includes a signal ground 28 ($\nabla$). Slider 23 of potentiometer 21 is positioned in either direction from the electrical center of resistor 22 which has a potential corresponding to that of signal ground 28 by an operating means 24. The operating means 24 may be positioned by the motor 10 that positions the control surface 12, or other operating means may be provided to proportion the slider displacement in accordance with the displacement of the motor 10. A conductor 30 connects slider 23 with one end of resistor 31 of a ratio potentiometer 32 which includes an adjustable slider 33. Slider 33 may be positioned along resistor 31 in accordance with the difference of the dynamic pressure and static pressure sensed by a Q sensor 34. The opposite end of resistor 31 is connected to signal ground. A modification of the signal from slider 33 is provided by a follow-up adjustment potentiometer 37 and to this end a resistor 36 of a potentiometer 37 has one end connected to slider 33 and its opposite end connected to signal ground. An adjustable tap 38 may be positioned along resistor 36. A summing resistor 39 extends from adjustable tap 38 to a summing point terminal 40. A capacitor 41 and resistor 42 connected in series relation extend between point 40 and a summing conductor 43 of network 19. A resistor 44 extends from the junction of capacitor 41 and resistor 42 to signal ground, and the capacitor 41 may be bypassed by a single pole-single throw switch 45 connected between point 40 and the aforesaid junction.

Signal generator 46 comprises a pitch rate potentiometer 48 having a resistor 49 connected across conductors 26, 29 and a slider 50. Slider 50 may be positioned along resistor 49 in either direction from the electrical center thereof having a potential corresponding with that of signal ground 28 by a pitch rate sensing device 51. The rate sensing device 51 may be a conventional rate gyroscope having a rotor rotatable about a spin axis and spring restrained against precession about an axis at right angles to the spin axis. Such devices are known in the art as velocity gyroscopes or by equivalent terms, and the gyroscope 51 precesses an extent depending upon the pitch rate of the craft. A conductor 52 connects slider 50 with a division point terminal 53. A pitch rate signal branch 54 extends from point 53 to summing point 40. Branch 54 comprises a pitch rate to elevator ratio potentiometer 55 having a resistor 56 connected at one end to point 53 and its opposite end to signal ground. Potentiometer 55 includes an adjustable tap 57 which may be adjusted along resistor 56 in accordance with the air pressure "Q" affecting the craft. Tap 57 may be adjusted by a device similar to device 34. Adjustable tap 57 is connected to one end, through conductor 58, of a resistor 59 of a pitch rate adjustment potentiometer 60 having its opposite end connected to signal ground. Potentiometer 60 includes an adjustable tap 61 which is connected through a summing resistor 62 to summing point 40.

A lag rate branch 65 also connects terminal 53 with conductor 43. A resistor 66 in branch 65 connects point 53 with a sub-terminal point 67. A resistor 68 of a lag pitch rate adjustment potentiometer 69 is connected between point 67 and signal ground. Potentiometer 69 includes an adjustable tap 70. Series connected resistors 71, 72 connect slider 70 with summing conductor 43. The junction of slider 70 and resistor 71 is connected to signal ground by an operated or in contact j of relay E to be described. The contacts are normally open. The junction of resistors 71 and 72 is connected to signal ground through a capacitor 73. The resistors 71, 72 along with capacitor 73 comprise a lag network for the pitch rate signal applied to branch 65.

Trim signal generator 76 comprises a trim potentiometer 77 having a resistor 78 connected across conductors 26, 29 and an adjustable slider 79 which may be manually positioned along resistor 78 to supply desired signals. Slider 79 is connected through conductor 80 and summing resistor 81 in series to sub-terminal 67.

Signal generator 82 comprises a pitch attitude potentiometer 83 having a resistor 84 connected across conductors 26, 29 and an adjustable slider 85. A conductor 86 extends from slider 85 to one end of resistor 87 of a pitch attitude adjustment potentiometer 88, the opposite end of the resistor being connected to signal ground. Potentiometer 88 includes an adjustable tap 89, and a capacitor 90 extends from tap 89 to a terminal point 92. Terminal point 92 is connected to signal ground through a circuit comprising in series relation a normally closed or out contact f of an A relay and a normally closed or out contact u of a B-relay to be described. Terminal point 92 and a second terminal point 93 may be connected through an operated or in contact s of the B-relay or alternatively through an operated or in contact z of the A-relay. A summing resistor 94 connects terminal 93 with a terminal point 95 from which a conductor 96 extends to the summing conductor 43. Terminal point 93 is connected to signal ground through a capacitor 98, but capacitor 98 is shunted by a resistor 99 in series with a normally closed or out contact l of the E-relay. The slider 85 of potentiometer 83 may be positioned in either direction from the electrical-center of resistor 84 by a pitch attitude device such as a vertical gyroscope 97. Gyroscope 97 displaces slider 85 from the electrical center in proportion to the magnitude of the change in attitude of the craft from a given pitch attitude.

Signal generator 102 comprises a Mach displacement potentiometer 103 having a resistor 104 connected across conductors 26, 29 for energization thereof and an adjustable slider 105. Resistor 104 includes a center tap connected to signal ground. Slider 105 may be positioned along resistor 104 in either direction from the center tap by a suitable drive means including a magnetic clutch 129 connecting it with Mach sensor 106 in accordance with the existing speed in Mach number of the craft. A protective resistor 107 has one end connected to slider 105 and its opposite end to one end of resistor 108 of a Mach displacement adjustment potentiometer 109 having its opposite end connected to signal ground. Potentiometer 109 includes an adjustable slider 110 which is connected through a resistor 111 to a summing point terminal 112. Terminal 112 may be connected to a second terminal point 114 through a conductor 113 and normally open or in contact v of the B-relay. A conductor 115 connects terminal 114 to one end of resistor 116 which has its opposite end connected to terminal point 95. A signal storing device such as a capacitor 117 extends between conductor 115 and signal ground. Capacitor 117 is shunted by a resistor 118 in series with normally closed or out contact k of the E-relay.

Signal generator 120 develops a signal in accordance with the Mach rate of the aircraft and the generator 120 may be of the A.C. type. In this instance its output is supplied to a demodulator or converter 121 which in turn has its output connected through a conductor 122 to one end of a resistor 123 of a Mach rate adjustment potentiometer 124. The opposite end of resistor 123 is connected to signal ground. Potentiometer 124 includes an adjustable tap 125 which is connected through series arranged resistors 126, 127 to terminal 112. The junction of resistors 126, 127 is connected to signal ground through a capacitor 128.

Signal generator 130 includes an altitude displacement potentiometer 131 having a resistor 132 connected for its energization across signal supply conductors 26, 29 and an adjustable slider 133. Slider 133 is displaced relative to a center tap connection of resistor 132 in accordance with the displacement of the altitude of the craft from a selected altitude. This displacement of slider 133 is effected by an altitude sensing device 135 connected thereto through a suitable magnetic clutch 156 having a winding 159. A protective resistor 136 connects slider 133 to one end of resistor 137 of an altitude displacement adjustment potentiometer 138. The opposite end of resistor 137 is connected to signal ground. Potentiometer 138 includes an adjustable tap 139 which is connected through a summing resistor to a summing point terminal 140. A conductor 141 connects terminal 140 to one end of resistor 142 of a scheduling potentiometer 143. The opposite end of resistor 142 is connected to signal ground. Potentiometer 143 includes an adjustable tap 144 which is displaced toward signal ground with increasing values of Mach. Slider 144 may be connected through in or normally open contact y of the A-relay to terminal 114.

Signal generator 146 develops a signal of the A.C. type proportional to the rate of change of altitude of the craft. Its output is supplied to a demodulator or converter 147 having in turn its output connected by a conductor 148 to one end of resistor 149 of an altitude rate adjustment potentiometer 150. The opposite end of resistor 149 is connected to signal ground. Potentiometer 150 includes an adjustable tap 151 which is connected through a resistor 152 and resistor 153 in series to terminal 140. The junction of resistors 152, 153 is connected through a capacitor 155 to signal ground.

With respect to the Mach control and the altitude control, they have been illustrated herein as two alternative controls to be applied. Instead of Mach control however air speed control could be substituted. The applicant does not allege his invention includes specific means for obtaining Mach or altitude signal and the arrangement for obtaining the altitude displacement signal on potentiometer 131 and the altitude rate signal from signal generator 146 may be similar to that disclosed in an application of Rober J. Kutzler, filed January 29, 1951, Serial No. 208,391. The potentiometer 131 herein corresponds with potentiometer 68 of the Kutzler application and the altitude rate signal generator 146 corresponds with the velocity signal generator 103 of Kutzler. In the Kutzler application the operation of potentiometer 68 is preceded by the energization of a magnetic clutch having an operating winding 116 corresponding with an altitude clutch winding 159 of Figures 1A and 1B in the present arrangement. The A.C. signal from velocity signal generator 146 instead of being directly utilized as is the signal from generator 103 of the Kutzler arrangement is passed through an A.C. to D.C. converter or demodulator 147 before being applied to network 19. Altitude displacement and altitude rate providing devices are thus admittedly old and the invention herein is concerned primarily with the utilization of such signals. Similarly Mach displacement signals and Mach rate signals have been illustrated herein as an alternative control. No novelty is claimed for the arrangement for providing such Mach displacement and Mach rate signals but the novelty is in the application of such signals alternatively to the altitude control signals. A Mach displacement signal may be provided by an existing arrangement of the force rebalance type generally similar to the altitude sensor of Kutzler. Similarly a Mach rate signal may be provided by a velocity signal generator comparable to the altitude rate signal generator 103 of Kutzler. Again the A.C. Mach rate signal developed by signal generator 120 is converted through a demodulator 121 to D.C. signals which may be utilized in network 19.

Should it be desired to utilize airspeed instead of Mach signals it is apparent that air speed displacement signals may be provided in an arrangement such as disclosed in the patent to Struthers 2,620,149.

Figure 1B illustrates the selector switch for electing the flight configuration or control signals that are effective in network 19. In the figure, a function selector 160 includes an operable knob 161 having three operable positions M, R and A. In the M position the craft is under Mach control, in the R position the craft is under basic pitch rate control, and in the A position the craft is under altitude control. The selector 161 through a suitable operating means 162 positions two single pole-double throw switch arms 163, 164. In the unoperated position, when Mach control is not selected, switch arm 163 coacts with a selector unoperated contact 165 and switch arm 164 coacts with a contact 167. In the Mach selected position of the selector 161 switch arm 163 coacts with a contact 166 and switch arm 164 contacts with a contact 168. The switch arms may be biased to unoperated position by suitable spring means 177 and held in operated position by solenoid means. The selector 161 through suitable operating means 169 operates in the altitude selected position to position arms 170 and 171 into engagement with contacts 173 and 175 respectively. When knob 161 is in other than the altitude position, the switch arms 170 and 171 coact with unoperated contacts 172, 174. Spring means 178 may be used to bias the switch arms 171, 170 to unoperated position.

Four solenoid operated relays are provided. They are the altitude control relay A, the Mach control relay B, a pitch mode selector relay D, and a second pitch mode selector relay E. The A relay comprises an operating winding 179 and an armature 180 for positioning arms 181, 182, 183, 184, and 185. Arms 181, 182, 183, 184 coact respectively with relay in or normally open contacts $w$, $x$, $y$ and $z$. Arm 185 coacts with a normally closed or relay out contact $f$. One end of winding 179 is connected to a terminal 187 and the opposite end is connected to ground. A holding circuit for relay A is provided through a conductor 188 extending from in contact $w$ to terminal 187. One end of the altitude engage magnetic clutch winding 159 is connected to terminal 187 and its opposite end is connected to ground. The control relay B includes an operating winding 190 to move its armature 191 and thus operate relay arms 192, 193, 194, 195, 196. These arms engage respectively with in contacts or normally open contacts $r$, $t$, $v$, $s$, and normally closed or out contact $u$. One end of relay winding 190 is connected to ground and its opposite end to an input terminal 197. A holding circuit for the relay is provided by a conductor 198 extending from relay arm 192 to terminal 197. A magnetic clutch winding 199 for introducing Mach displacement signals has one end connected to ground and its opposite end connected to conductor 198.

The D-relay comprises an operating winding 202 which positions its armature 203 to operate arms 204, 205. Arms 204 and 205 engage respectively with out or normally open contact $m$ and normally closed or out contact $n$.

Relay winding 202 is associated with a time delay network 201 which comprises a time delay path having in series capacitor 206 and resistor 221; the capacitor shunts winding 202. There are also two additional shunting circuits for the winding. One additional circuit comprises normally open contact $x$ of relay A and the second includes a normally open or in contact $t$ of relay D. When either contact $x$ or $t$ is closed or in, the winding 202 is shunted and cannot be energized. Upon opening contacts $x$ or $t$ from their closed position, an interval is required in which capacitor 206 is substantially charged before winding 202 can be sufficiently energized to operate its armature 203.

Relay E comprises an operating winding 208 which positions its armature 209 which operatively positions arms 210, 211, 212, 213. Arms 210, 211, 212, and 213 coact respectively with normally closed or out contact $h$, $k$, $l$, and normally open contact $j$.

Included in the relay control system are two single pole-single throw switches 176, 215. Additionally a single pole-single throw switch 216 may connect voltage supply 27 to conductor 29 and a single pole switch 217 may conduct supply 27 to conductor 26.

*Operation*

The present invention is to be considered as being utilized in conjunction with a rudder control system and an aileron control system of an aircraft. In other words while the present invention relates to mechanism for operating the elevator surface, yet the operation of this elevator surface in straight flight in the present configuration differs from that when the craft is in a banked turn. Banked turns however are made through ailerons and rudder of an aircraft.

Assuming that the aircraft has been manually controlled and placed in the desired heading and properly aligned longitudinally and laterally, during which period a valve 189 may be opened to place in communication opposite sides of the servo ram, and subsequently closed. Switches 216, 217, may be operated thereafter to energize the supply conductors 26, 29. Switches 176 and 215, Figure 1B, may be placed in closed position and the function selector 161 placed in the R position. With switches 176 and 215 closed, 28 volts D.C. are supplied through conductor 218, switch 176, conductor 219, switch 215, conductor 220, resistor 221, to relay winding 202 of relay D. Additionally, a circuit is completed from energized conductor 219, conductor 222, normally closed relay contact n of relay D, relay winding 208, to ground.

After a time interval during which capacitor 206 is substantially charged, relay windings 202 may be sufficiently energized to operate arms 204 and 205. As arm 205 is disengaged from contact n, the above described circuit for winding 208 of relay E is broken, and the E relay drops to the out or unoperated position.

When automatic elevator control is applied with selector 161 in position R, signals are supplied to servomotor control network 19 from the follow-up signal generator 20, the pitch rate signal generator 46 through branch 54 and also through branch 65 since the j contact of relay E is open, and from the trim signal generator 76. Signal generator 82 is not included in the network at this time since any signal from potentiometer 83 is grounded through closed relay contact f and u. No Mach control signal is applied to network 19 since contact v is open, and no altitude control signal is supplied to network 19 since contact y is open.

If the selector 161 be placed in position M, a circuit is completed to energize relay B comprising conductor 218, switch 176, conductor 224, arm 164, contact 168, conductor 225, in contact m of relay D, conductor 226, terminal 197, relay winding 190 to ground. With winding 190 energized a holding circuit therefore is provided as stated through energized conductor 225, conductor 227, in contact r, relay arm 192, conductor 198, to terminal 197 and winding 190.

With relay B operated, relay contact t is closed shunting winding 202 of relay D causing it to drop out with normally closed contact n now engaged.

With the B relay winding 190 energized, the magnetic clutch winding 199 in parallel with it is also energized to permit the operation of the Mach displacement signal generator 103, Figure 1A.

With contact n closed, relay E is energized from energized conductor 222, relay contact n, relay winding 208 to ground. With the E relay contact j engaged, the lag pitch rate single branch 65 is connected to signal ground and no lag pitch rate signal is applied to network 19. However, with the B relay u contact disengaged and the s contact engaged, a signal from the vertical gyroscope potentiometer 83 is supplied to network 19 as a pitch attitude stabilizing signal. Additionally Mach control signals derived from the Mach displacement potentiometer 103 and the Mach rate signal generator 120 are supplied through in contact v and conductors 115 to network 19.

If we move the function selector 161 from the M to the R position, conductor 225 is de-energized as arm 164 disengages contact 168. The B-relay drops to the out position opening the contact t of the relay B. After a time delay capacitor 206 becomes substantially charged and the D relay winding 202 operates its switch arms 204, 205 thereby interrupting the circuit for the E relay winding 208 at contact n.

On the operation of arm 164 in the function selector to disengage contact 168 to de-energize relay B, to ground the vertical gyro potentiometer 83 through contacts f and u, and open contact s, a sufficient time was thereafter available so that capacitor 98 could discharge through bridge 19 at a slow rate to fade out any signal previously stored in capacitor 98 from Mach potentiometer 83. After the time interval elapsed, relay D operated, and with the n contact disengaged, relay E dropped out and its contact l was engaged. With contact l engaged, a quick discharge circuit for capacitor 98 was provided through resistor 99 and contact l to signal ground to remove any remaining attitude control signal.

The Mach control signal is similarly faded out or had its effect gradually decreased in that de-energizing relay B disengaged contact v. However, the time delay contained through capacitor 206 permitted the contact k of the E-relay to be momentarily maintained open. Consequently, the charge on capacitor 117 obtained from the Mach displacement signal generator 106 and the Mach rate signal generator 120 was permitted to discharge through network 19. After the time delay period had expired and relay D operated, relay E dropped to the out position whereby a quick discharge path was provided for any remaining Mach control signal in capacitor 117 through resistor 118 and out contact k to signal ground.

When the selector 161 is moved to the altitude control position, a circuit is completed from energized conductor 224, a conductor 230, switch arm 170, contact 173, conductor 231, switch arm 171, contact 175, a conductor 232, E relay out contact h, conductor 233, relay terminal 187, relay winding 179 to ground. A parallel circuit also extends from terminal 187 through winding 159 of the altitude engage clutch 156 corresponding with the winding 116 of the Kutzler application to couple the altitude displacement potentiometer slider 133 to the altitude sensing arrangement 135. A holding circuit for the A relay winding 179 is provided through the conductor 188, in contact w, arm 181, conductor 234 as described, which complete a shunting circuit for the contact h. With the A relay energized thereby engaging contact x in the time delay network 201, winding 202 of the D relay is shunted and it drops to out position. With the relay D out, contact n is engaged and the relay E is energized.

In network 19, contact y is then in and thus altitude displacement and altitude rate signals are supplied to conductor 115 and capacitor 117 begins to charge up. By this charging up of capacitor 117, the altitude displacement and altitude rate signals are faded into network 19 to effect gradual increasing control of the elevator surface. In the vertical gyro signal circuit, the f contact is broken or disengaged and the z contact is engaged to permit pitch attitude stabilizing signals from potentiometer 83 to be applied to circuit 19. Since the D-relay is out, the E-relay will be in, consequently the l and k contacts will be disengaged but again the j contact will be engaged in branch 65 to disable lagged pitch rate signals from controlling network 19.

If the selector 161 be returned from the altitude to the rate or R position, arm 171 is disengaged from contact 175 breaking the circuit for the A relay winding 179 so that the A-relay drops out. With the A-relay f contact again engaged, and contact u engaged, the vertical gyro potentiometer output on terminal 92 is directly connected to signal ground disabling it from attitude control. The z contact is disengaged isolating the network 19 from pitch attitude potentiometer 83.

However, with the time delay period not expired, relay E is still energized so that capacitor 117 which had stored up the altitude control signal now discharges slowly through servomotor control network 19 to fade out the altitude control signal. After the time interval expires, the winding 202 of the D relay operates to break the circuit for the E relay at contact N. As relay E drops out contact k is re-engaged so that a quick discharge circuit is again provided for capacitor 117 through resistor 118 and closed contact k to signal ground.

Further, as the E-relay drops out the lagged pitch rate circuit branch 65 is no longer connected to signal ground with the j contact opened so that lagged pitch rate control is applied to the network 19. It should be also noted that with the operation or the engagement of out contact l of the E-relay that resistor 99 shunts capacitor 98. Consequently this shunt not only provides a quick discharge path for capacitor 98 but serves the additional function of preventing the capacitor 98 from applying a lag effect to other control signals such as to the pitch rate signal from branch 54, for example. In other words, whatever capacitance capacitor 98 might have between conductor 43 and signal ground is substantially avoided by the shunting circuit of resistor 99 and normally closed contact l of relay E.

It was stated previously that the present invention as applied to the elevator channel of an automatic pilot was to be used in conjunction with the rudder and aileron control channels. Aileron and rudder are used to make banked turns. When such banked turns are contemplated, the capacitor shunting switch 45, Figure 1A, is in open position in which position the capacitor 41 is not shunted. In a banked turn, the pitch rate gyroscope potentiometer 48 due to th eresponse of the pitch rate gyroscope 51 because of cross coupling would apply a signal tending to effect down operation of the elevator surface. However, due to the capacitor 41, a signal from the pitch rate potentiometer 48 which is of a steady value during a banked turn of constant rate does not pass through capacitor 41 to conductor 43 and thus has no control on network 19.

It may be similarly appreciated that when on altitude control it may be desirable to make a banked turn at constant altitude. However, again, a pitch rate effect would be provided through the lagged rate network branch 65 to network 19 unless it were eliminated. Consequently, in either the Mach or altitude control modes, the vertical gyro is substituted for the lagged rate network as a source of displacement signals for pitch attitude. In other words, on altitude control with relay A energized, relay D is unenergized and relay E is energized which closes contact j whereby branch 65 of the lag network is connected directly to signal ground. Thus, no undesirable pitch rate effects are supplied in a banked turn from the lag network 65 to main network 19.

It will now be realized from the above with respect to the Mach or altitude mode that if we move the function selector 161 from the Mach configuration to the altitude configuration that the Mach control signal is slowly faded out or slowly decreased and after the fade out has been completed the new control signal may be faded in or slowly caused to increase its control effect in the network 19.

It will therefore be apparent that there has been provided an arrangement for operating a condition controlling device such as a craft attitude controller and in which novel means have been provided for changing control thereof from one variable to another and wherein a first variable may be slowly decreased in effect and sequentially therewith the second controlling effect may be slowly increased whereby control from one variable to the other may be effected without sudden or violent operations of the control device.

While many changes could be made in the above construction and other embodiments of the invention could be made without departing from the spirit thereof, it is intended that the limits of the invention shall be defined by the following claims.

What is claimed is:

1. Control apparatus for an aircraft having an elevator surface for controlling the craft about its pitch axis, said apparatus comprising: motor means controlling said surface; control means including a balanceable parallel summing D.C. signal network operating said motor means on unbalance of said network; a source of control voltage; responsive means including a first variable signal generator connected to said source and responsive to a first flight condition of said craft; means including a first relay having a set of normally open contacts but effective on closing to connect said first signal generator in said network; means including a second variable signal generator connected to said source and responsive to a second flight condition of said craft; connecting means comprising a second relay having a set of normally open contacts effective on closing to connect said second signal generator in said network; a capacitor connected between said network and a null point of said source of control voltage; a shunt circuit for said capacitor comprising a resistor and a set of normally closed contacts, of a third relay, in series; means including a function selector having two selected positions for alternatively energizing the first or second relay for selecting control of said variable network by one or the other of said signal generators; and means including contacts of said first two relays and time delay means effective when the selector is moved from one position to the other to open the contacts of the first selected relay, to close the contacts of the third relay to initially enable said capacitor to discharge through said network at a slow rate and thereafter through said last recited contact of the third relay and said resistor at a rapid rate and thereafter on energization of the second selected to effect reopening of said last named third relay contacts to enable said capacitor to be charged substantially in accordance with the magnitude of the signal from the last selected condition signal generator to effect the gradual increasing control of said network from said last selected generator.

2. Control apparatus for an aircraft having an attitude control device and motor means for operating said device, said apparatus comprising control mens including a balanceable parallel summing D.C. signal network operating said motor means on unbalance of said network; air pressure responsive means comprising a first signal generator connected to said source and responsive to a first flight condition of said craft; means including a first relay having a first set of normally open contacts effective on closing on energization of the first relay to connect said first signal generator in said network; a shunt capacitor connected between said network and a null point of said network; a shunt circuit for said capacitor comprising in series a resistor and a second set of normally open contacts of a second relay; a function selector having two positions and in one position energizing the first relay providing control of said network by said signal generator; and operable time delay means rendered ineffective on an energization of the first relay and energized when the selector is moved from the one position to deenergize the first relay thus to the other position to render said generator ineffective to control said network, to enable said capacitor to discharge initially through said network at a slow rate and on operation of the time delay means thereafter close said normally open contacts whereby said capacitor discharges through said resistor and second set of contacts at a rapid rate, to effect a "fading out" of the effect of the signal generator on said network.

3. In condition control apparatus having a device for controlling a condition and motor means for operating said device, in combination: control means including a balanceable D.C. signal network operating said motor means on unbalance of said network; means comprising a first signal generator responsive to a condition; means comprising a first relay having a first set of normally open contacts but effective on closing to connect said first signal generator in said network; a capacitor connected between said network and a null point of said network; a shunt circuit for said capacitor comprising in series a resistor and a second set of open contacts of a second relay; and a function selector having two positions to effect in one position closing of the first contacts to effect control of said network by said signal generator and in the other position effect opening of the first contacts; and operable time delay means, including other contacts of the first relay, effective when the selector is moved from the one position to the other to effect opening of the first contacts to enable said capacitor to discharge through said network at a slow rate and thereafter on operation of the time delay means effect closing of said second contacts so the capacitor discharges through said resistor and second set of contacts at a rapid rate, to enable said generator to be severed from said network and to effect a gradual decreasing control of the signal of said generator in said capacitor on said network.

4. Apparatus for controlling two alternative conditions and having a control device operable by motor means for effecting said control, said apparatus comprising control means including a balanceable parallel summing D.C. signal network operating said motor means on unbalance of said network; means comprising a first variable signal generator responsive to a first condition; a first relay means having a first set of normally open or in contacts but effective on closing to connect said first signal generator in said network; means including a second signal generator responsive to a second condition; a second relay means having a second set of normally open or in contacts but effective on closing to connect said second signal generator in said network; a capacitor connected between said network and a null point of said network; a shunt circuit for said capacitor comprising in series a resistor and a third set of open contacts of a third relay means; a relay energizing circuit means having a manually operable selector having two positions for alternatively selecting control of said network by one or the other of said signal generators by energizing one or the other of said first or second relay means; and time delay means including in contacts of both relay means and effective when the selector is gradually moved from one position to the other to disconnect the selected generator and network, to enable said capacitor to discharge initially through said network at a slow rate with the third set of contacts open and thereafter energize said third relay means to close said third contacts so that the capacitor discharges through said resistor and third set of contacts at a rapid rate and thereafter with said selector in the other position to effect reopening of said normally open third contacts to enable said capacitor to be charged in accordance with the magnitude of the signal from the other condition signal generator to effect the gradual increasing control of said network from said second generator.

5. Control apparatus for an aircraft having an elevator surface for controlling the craft about its pitch axis and motor means operating said surface, said apparatus comprising: control means including a balanceable motor control D.C. signal network operating said motor means on unbalance of said network; means including a first signal generator responsive to a first flight condition of said craft; a first operable connecting means effective on operation to connect said first signal generator in said network; an electrical signal storage means connected between said network and a neutral point of said network; a means including shunt circuit for said storage means comprising in series a resistor and a second operable connecting means; a selector means controlling the first operable connecting means having two positions for either selecting control of said network from said signal generator or omitting control of said network by said generator; and selector position responsive means including time delay means effective when the selector is moved from the generator control of network position toward the other position, to enable said storage means to discharge initially through said motor control network at a slow rate, to effect operation of the second operable connecting means after a time delay to effect more rapid rate of discharge of said storage means through said shunt circuit and thereafter when the selector is in the second position to move the second operable connecting means to unoperated position by making the time delay means ineffective.

6. Control apparatus for an aircraft having motor means operating a control surface to control craft attitude about an axis, said apparatus comprising: control means including a balanceable D.C. network operating said motor means on unbalance of said network; attitude sensing means generating a D.C. signal proportional to change in attitude about said axis; means comprising a first relay having a set of normally closed contacts connecting said signal generator to a neutral point of said network; a second set of normally open contacts of said relay effective on closing to connect said signal generator and a terminal; connecting means extending from said terminal to said network; a shunting capacitor connecting said terminal to said neutral point; for storing said attitude signal a resistor and a set of open contacts of a second relay in series shunting said capcitor; means including a two position manually operable selector; and time delay operable means controlled by said selector through a third set of normally open contacts of said first relay and effective on change in position of said selector to effect de-energization of the first relay to close its first set of contacts and open its second set to disconnect said signal generator and terminal to enable said capacitor to discharge at a slow rate through said network initially during said time delay period, to close said contacts of the second relay after the time delay period to effect rapid discharge of said capacitor through said resistor.

7. The apparatus of claim 6; and means responsive to a second flight condition of said craft for generating a second D.C. signal; and means effective on energization of said first relay for connecting said second generating means into said network.

8. Control apparatus for an aircraft having an attitude control device and motor means operating said device, said apparatus comprising: control means including a D.C. signal summing network operating said motor means on unbalance of said network; sensing means responsive to flight positions of said craft from a datum and providing a D.C. signal in accordance therewith; first connecting means effective on operation to connect said sensing means into said network; a capacitor connected between a first point of said network and a null point of said network, said points having different potentials; a shunt or discharge circuit for said capacitor comprising a resistor, said shunt circuit being controlled by a second connecting means; a manually operable selector which in one position controls operation of the first connecting means thereby providing control of said network by said sensing means; a time delay means rendered inoperative on operation of said first connecting means but having its operation initiated by movement of the selector from said one position which movement causes return of the first connecting means to an inoperative position and enables said capacitor to initially discharge through said network; a further means responsive to said time delay means and effective after a timed delay to operate said second connection means whereby said capacitor discharges through said resistor to effect rapid discharge thereof.

9. Control apparatus for an aircraft having an attitude control device and motor means operating said device, said apparatus comprising: control means including a D.C. signal summing network operating said motor means on unbalance of said networks; sensing means responsive to changes in a flight condition of said craft and providing a D.C. signal in accordance therewith; first connecting means effective on operation from a first to a second position to connect said sensing means into said network; a capacitor connected between a first point of said network and a null point; a shunt or discharge circuit for said capacitor comprising a resistor and closed by movement from a first to a second position of a second connecting means; a manually operable selector which in one position controls operation of the first connecting means to the second position thereby providing control of said network by said sensing means; a time delay means rendered inoperative on operation of said first connecting means to the second position but having its operation initiated by movement of the selector from said one position which movement causes return of the first connecting means to the first position or an inoperative position and enables said capacitor to initially discharge through said network; a further means responsive to said time delay means and effective after a time delay to operate said second connecting means to the second position whereby said capacitor discharges through said resistor to effect rapid discharge thereof.

References Cited in the file of this patent
UNITED STATES PATENTS

| | | |
|---|---|---|
| 2,662,704 | Huntington | Dec. 15, 1953 |
| 2,673,314 | MacCallum | Mar. 23, 1954 |